F. NIELSEN.
SHOCK ABSORBER.
APPLICATION FILED JUNE 8, 1911.
999,843.
Patented Aug. 8, 1911.
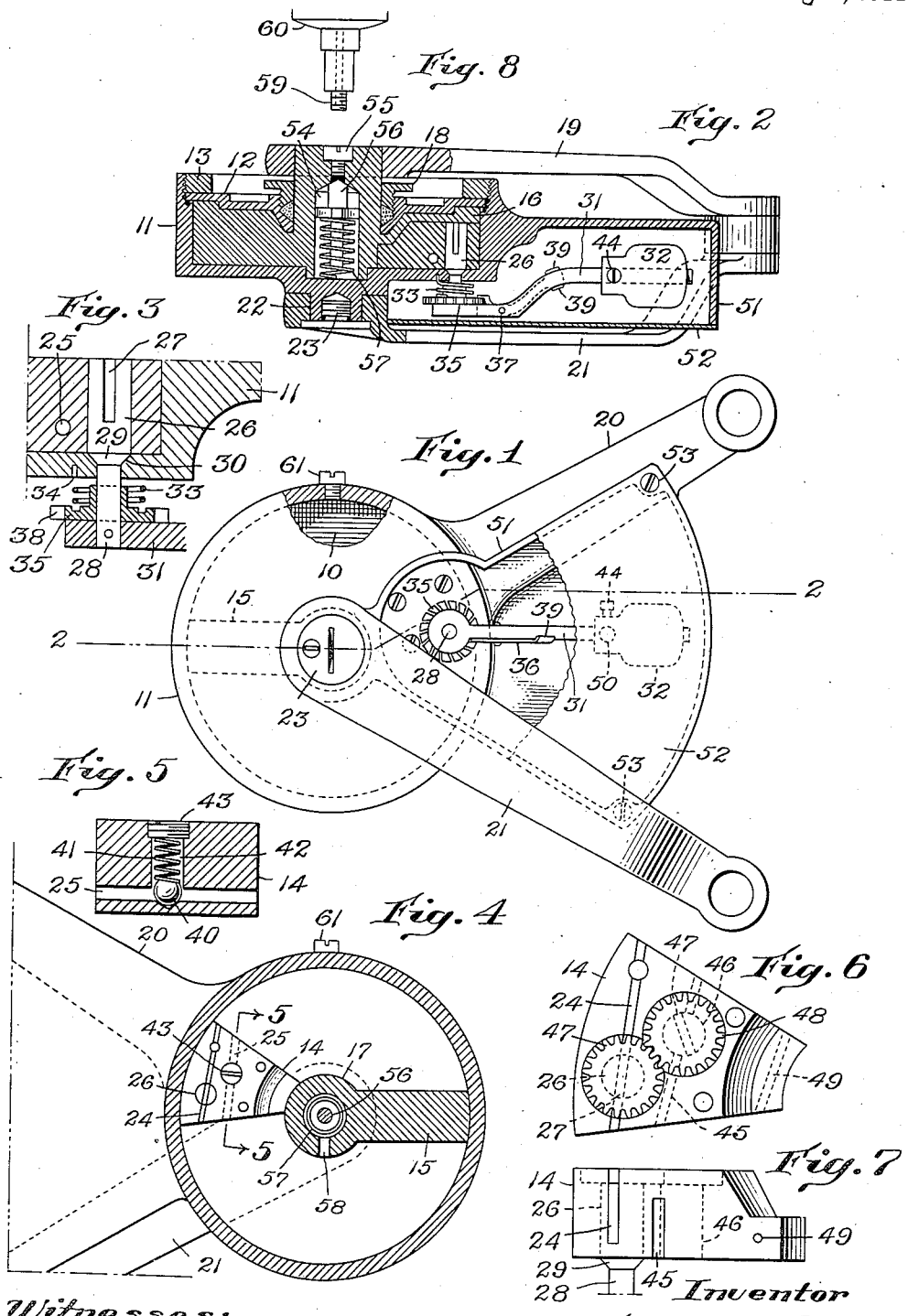
Witnesses:
F. R. Ponlstone
W. P. Abell
Inventor
Frederik Nielsen
by Wright, Brown, Quinby & May
Attorneys

UNITED STATES PATENT OFFICE.

FREDERIK NIELSEN, OF BOSTON, MASSACHUSETTS.

SHOCK-ABSORBER.

999,843.  Specification of Letters Patent.  Patented Aug. 8, 1911.

Application filed June 8, 1911. Serial No. 631,915.

*To all whom it may concern:*

Be it known that I, FREDERIK NIELSEN, of Boston, in the county of Suffolk and State of Massachusetts, have invented certain new and useful Improvements in Shock-Absorbers, of which the following is a specification.

The present invention relates to shock absorbers for vehicles and consists in several features of improvement upon the shock absorber illustrated and described in my copending application, Serial Number 587,203, filed October 15, 1910.

The cushioning medium in the present invention and that to which the aforesaid application relates is a fluid, and it is contained in the chamber of a casing in which coöperative elements are arranged to act upon the fluid. These coöperative elements divide the main chamber into two smaller chambers, and the cushioning fluid is conducted back and forth from one of the smaller chambers to the other through suitable passages. The flow through at least one of the passages is controlled by a valve which is weighted and which is provided with spring-tension means whereby the valve is normally held in open position. The valve is so weighted as to be operated automatically by jouncing of the vehicle, but since the valve is normally held open it is obvious that the cushioning fluid must pass back and forth through the passage when the vehicle is traveling over comparatively smooth even ground.

It is found in practice that a shock absorber which is well adapted for one vehicle is not so well adapted for another vehicle. This is because of the difference in weight of the vehicles and the difference in the resilience of the springs upon which the vehicle body is mounted. The features of improvement hereinafter described are adapted to regulate the shock absorber so that it may be adapted to various vehicles which differ from each other in the particulars above noted.

Of the accompanying drawings which illustrate the invention: Figure 1 represents a side elevation of a shock absorber with portions thereof broken away to expose the interior. Fig. 2 represents a section in the planes indicated in Fig. 1 by line 2—2. Fig. 3 represents, on a larger scale, the weighted valve by which the cushioning fluid is controlled. Fig. 4 represents a cross section of the shock absorber in a plane transverse to the axis thereof. Fig. 5 represents, on a larger scale, a valve in the plane indicated in Fig. 4 by line 5—5. Fig. 6 represents an elevation of valve mechanism which may be substituted for that shown in the preceding figures. Fig. 7 represents an edge view of the valve mechanism of Fig. 6. Fig. 8 represents a portion of a grease gun which may be used to inject grease into the shock absorber.

The same reference characters indicate the same parts wherever they occur.

The chamber in which the cushioning fluid is contained is indicated at 10 and is formed by a cylindric casing 11 having a cover 12. The cover is held in position by a ring 13 which is connected with the casing by coöperative screw threads. The chamber 10 is divided into two smaller chambers, as shown by Fig. 4, by abutments 14 and 15, one of which is movable with relation to the other to act upon the cushioning fluid. In the present instance the abutment 14 is affixed to the casing by suitable screws, and the abutment 15 is mounted so as to oscillate with relation to the casing about the axis thereof. In order to distinguish between the two abutments, that indicated at 15 will be hereinafter designated a piston.

The piston is formed upon a disk 16 which slides between the abutment 14 and the cover 12 and which is preferably fitted so as to prevent, as far as possible, all leakage. The piston is formed with a hub 17 which projects through a central opening in the cover 12, as shown by Fig. 2. The cover is formed with a stuffing box, indicated as a whole at 18. An operating arm 19 is affixed in any suitable manner to the outer end of the hub 17. The casing 11 is provided with an arm 20 which, in conjunction with the arm 19, constitutes the means whereby the abutments 14 and 15 are moved to act upon the cushioning fluid. A third arm, indicated at 21, is attached to the casing, but it has no function other than to counterbalance the weight of the arm 19 and to brace the casing so that the device may be operated more efficiently. The casing is provided with a cylindric boss 22 upon which the arm 21 is loosely mounted. A screw 23, threaded in the boss and provided with a suitable head overlapping the arm 21, serves to connect the arm with the casing and at the same time permit the casing to oscillate with relation to the arm, or the arm with relation to the casing.

The passages for conducting the cushioning fluid back and forth from one of the smaller chambers to the other are indicated in Fig. 4 at 24 and 25. The passage 24 is preferably in the form of a groove and is preferably quite deep, but the passage 25 is preferably tubular as shown by Figs. 2, 3 and 5. The flow through the groove 24 is controlled by a valve 26 having a groove 27 adapted to register with the groove 24. This valve is of the oscillatory type and is adapted to control the flow through the groove 24 regardless of the direction in which it is turned. This valve is provided with a stem 28 which extends through a suitable opening in the casing 11. A frusto-conical portion 29 is fitted to engage a complementally formed seat 30 in the wall of the casing, whereby leakage through the casing at this point may be prevented.

An arm 31 affixed to the outer end of the valve stem is provided with an adjustable weight 32. The weight normally tends to turn the valve in one direction, but the valve is subject to the tension of a spring 33 which tends to turn it in the opposite direction. The weight and spring are preferably adjusted so as to cause the valve to normally occupy the position shown by Fig. 4. In this position the groove 27 registers with the groove 24 so that the cushioning fluid may pass freely from one of the smaller chambers to the other. The spring 33, as shown, is helical and surrounds the valve stem between the casing and the arm 31. The ends of the spring are bent so as to extend into suitable pockets such as that indicated at 34 in Fig. 3. (See also Fig. 2). A disk 35 is loosely mounted upon the valve stem between the casing and the arm 31. This disk is provided with a pocket, which is not illustrated but which is similar to the pocket 34, for the reception of one of the ends of the spring. By means of the disk the spring may be wound to the desired tension, and when connected to the arm 31 it will act to overcome the gravity of the weight 32. Any suitable means may be provided for connecting the disk with the arm 31. The device illustrated upon the drawings is a flat piece 36 connected to the arm by a pivot pin 37. The periphery of the disk is provided with notches 38 adapted to receive one end of the piece 36, as shown by Figs. 1 and 2. The locking piece 36 may be disengaged from the disk by turning it about its pivot 37, and the disk may be turned to cause any desired notch 38 to register with the locking piece. The opposite end of the locking piece is provided with ears 39 which are adapted to embrace the arm 31 and hold the locking piece in locking position. The locking piece may be flexed sufficiently to disengage the ears from the arm when the locking piece is moved to and from locking position.

Although the principal function of the spring 33 is to counteract the weight 32, it serves the additional function of keeping the frusto-conical portion 29 securely seated against the seat 30. For this purpose the spring is made so that it must be compressed longitudinally of its axis in order to place it between the disk 38 and the casing.

The passage 25 in the form shown by Fig. 4 is normally closed by a spring-actuated valve. The valve is adapted to be opened when the pressure of the cushioning fluid is sufficiently increased. A valve for this purpose is illustrated by Fig. 5. In the form illustrated the valve is in the form of a ball, indicated at 40. The ball is normally held in position to obstruct the passage 25 by a spring 41 contained in a pocket 42. The pocket is closed and the spring is confined by a screw plug 43. When the pressure of the cushioning fluid is increased sufficiently, it forces the valve open against the tension of the spring 41 and it is immaterial whether the flow through the passage 25 is in one direction or the other.

When the shock absorber is mounted upon a vehicle, the arm 20 is connected in any suitable way with the body thereof, and the arms 19 and 21 are connected with the running frame. The invention is not limited to this specific manner of connecting the arms with the vehicle, since it is obvious that the arm 20 could be as well connected to the running frame and the arms 19 and 21 connected to the body; but the arrangement first explained is preferred for the reason that the arm 20 is affixed to, if not a part of, the casing 11, and consequently the weighted valve 26 will partake of the jouncing movement of the vehicle body more readily when the arm 20 is connected directly to the body than when the manner of connecting the arms is reversed. So long as there is no violent movement of the vehicle body, the weighted valve 26 will remain in open position. Comparatively gentle movements of the vehicle body and running frame will cause relative movement of the piston 15, with the result of forcing the cushioning fluid gently back and forth through the passage 24. The passage 25 under such conditions is closed. A sudden jounce of the vehicle will effect the closing of the valve 26 because of the inertia of the weight 32. Communication between the two smaller chambers is thus closed and will remain closed until the inertia of the weight 32 is overcome by the increased tension of the spring 33. In the event of an excessively heavy jolt the valve 40 will be opened by the great pressure upon the cushioning fluid. The weight 32 is adjustable with relation to the arm 31 and is provided with a set-screw 44 by which it may be held at the desired position. The adjustability of the weight and the adjusting means for the spring 33 not only make it possible to regulate the opposing forces so as to hold the valve 26 normally in open position but they make it possible to regulate the speed of operation of the valve. Regulation of this kind is usually necessary when the device is first applied to a vehicle. If the vehicle is relatively light and the body is so mounted as to vibrate rapidly upon its supporting springs, it is necessary to adjust the weight 32 and spring 33 so that the action of the valve 26 will be comparatively rapid. On the other hand, if the shock absorber is applied to a vehicle having a heavy body whose up and down movements are comparatively slow, the weight 32 and spring 33 should be adjusted so as to retard the speed of the valve.

Under some conditions it may be desirable to provide two valves which will be operated by the weight 32 and spring 33. For example, Figs. 6 and 7 illustrate an abutment 14 having a groove 45 in addition to the groove 24. The abutment is also provided with a valve 46 in addition to the valve 26. The valve 46 is provided with a groove 47 similar to the groove 27, except that it is in the opposite end of the valve, because the groove 45 is formed in the opposite side of the abutment. The valves are connected with each other so that they will operate in unison when the weighted arm is oscillated. The preferred method of connecting the valves is to provide them with gears such as those indicated at 47 and 48. The abutment 14 is formed with recesses for the reception of the gears so that the outer faces of the gears may be flush with the surface of the abutment. This form of connecting means is not only the simplest form for the purpose, but it provides for adjusting the valve 46 with relation to the valve 26. The desired adjustment is made by moving the valve 46 and gear endwise to disengage the gear from its mate and by turning it to the desired position before assembling the other parts. No prescribed rule may be given for adjusting the valve 46 with relation to the valve 26. If the shock absorber is attached to one vehicle it might be better to adjust the valves so that they would both be normally open, while if the shock absorber is applied to a different vehicle it might give better results if the valve 46 were adjusted so that it would normally be closed while the valve 26 would stand in open position. Under such conditions the valve 46 would open when the valve 26 is closed, and there might be brief periods when both would be closed at the same time. This combination of valves may be employed with or without the normally closed valve 40. Under some conditions it might be desirable to include the valve 40 in addition to the valve 46.

The abutment 14, as shown by Figs. 6 and 7, is provided with a third passage, which is indicated at 49. This passage as shown is not provided with any valve, but it is to be understood that the passage may be entirely omitted if desired or may be provided with a normally closed valve similar to the valve 40.

The weight 32 is bored to provide a transverse opening 50 (see Fig. 1) which is adapted to receive the arm 31. The weight may be applied to the arm by passing the arm through the opening 50 instead of through the central opening as shown on the drawings, in which case a greater proportion of the weight would be remote from the axis of oscillation. The setscrew 44 is arranged to engage the arm 31 whether the weight be applied in the position shown or in the alternative position with the arm in the opening 50. For the purpose of protecting the weighted arm, the casing is provided with a flange 51 adapted to receive a cover plate 52. The cover plate is adapted to be fastened in position by screws 53.

The hub 17 of the piston is formed for the attachment of a grease gun whereby the cushioning fluid may be injected into the casing. As shown by Fig. 2, the hub is bored so as to provide a socket 54. A plug 55 is threaded in the outer end of the hub to close the opening leading to the socket 54. A valve 56 is contained in the socket and is normally seated against the outer end thereof by a spring 57. Communication is formed between the socket 54 and the interior of the casing by a port 58 in the hub. (See Fig. 4). In order to inject the cushioning fluid, the plug 55 is removed and a screw-threaded coupling member 59 is inserted in its place. The coupling member is adapted to form connection between the hub 17 and a grease gun, a portion of which is indicated at 60. When injecting the cushioning fluid it is necessary to provide open communication between the interior of the casing and the atmosphere so that the air in the casing may escape. For this reason the casing is provided with a suitable vent and a screw-threaded plug 61 for closing the same.

I claim:

1. A shock absorber comprising a casing having a closed chamber, coöperative relatively movable elements therein for acting upon a cushioning fluid, said elements dividing said chamber into two smaller chambers, two flow passages for conducting the cushioning fluid back and forth from one of said smaller chambers to the other, a spring-tensioned valve for normally closing one of said passages, said valve being adapted to be forced open by pressure of said cushioning fluid in either direction, and a weighted valve for controlling the flow in the other passage, said weighted valve having spring-tension means for normally holding it open.

2. A shock absorber comprising a casing having a closed chamber, coöperative relatively movable elements therein for acting upon a cushioning fluid, said elements dividing said chamber into two smaller chambers, two flow passages for conducting the cushioning fluid back and forth from one of said smaller chambers to the other, a weighted valve for controlling the flow in one of said passages, said valve having spring tension means for normally holding it in a predetermined position, a valve for controlling the flow through the other of said passages, and means connecting said valves for causing them to operate in unison.

3. A shock absorber comprising a casing having a closed chamber, coöperative relatively movable elements therein for acting upon a cushioning fluid, said elements dividing said chamber into two smaller chambers, two flow passages for conducting the cushioning fluid back and forth from one of said smaller chambers to the other, an oscillatory valve for each of said passages, gears connecting said valves whereby movement is transmitted from one to the other, a weighted member connected to one of said valves for turning it in one direction, and spring-tension means counteracting said weighted member.

4. A shock absorber comprising a casing having a closed chamber, coöperative relatively movable elements therein for acting upon a cushioning fluid, said elements dividing said chamber into two smaller chambers, a flow passage for conducting the cushioning fluid back and forth from one of said smaller chambers to the other, an oscillatory valve for controlling said passage, said valve having a stem projecting through the casing and having a transverse shoulder adapted to be seated against the casing to prevent leakage, a weighted member connected to said valve stem for turning the valve in one direction, and a spring acting on said valve stem to counteract said weighted member and to hold said transverse shoulder seated against the casing.

5. A shock absorber comprising a casing having a closed chamber, coöperative relatively movable elements therein for acting upon a cushioning fluid, said elements dividing said chamber into two smaller chambers, a flow passage for conducting the cushioning fluid back and forth from one of said smaller chambers to the other, an oscillatory valve controlling said passage, a weighted member connected to said valve to turn it in one direction, a coiled spring for counteracting said weighted member, a winding member for varying the tension of said spring, and a lock for said winding member, said winding member having a series of shoulders adapted to be engaged by said lock to maintain the desired tension.

In testimony whereof I have affixed my signature, in presence of two witnesses.

FREDERIK NIELSEN.

Witnesses:
W. P. ABELL,
P. W. PEZZETTI.